United States Patent
Grasso et al.

(10) Patent No.: US 7,523,336 B2
(45) Date of Patent: Apr. 21, 2009

(54) CONTROLLED POWER SEQUENCING FOR INDEPENDENT LOGIC CIRCUITS THAT TRANSFERS VOLTAGE AT A FIRST LEVEL FOR A PREDETERMINED PERIOD OF TIME AND SUBSEQUENTLY AT A HIGHEST LEVEL

(75) Inventors: Lawrence J. Grasso, Austin, TX (US); Bruce J. Wilkie, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 11/354,533

(22) Filed: Feb. 15, 2006

(65) Prior Publication Data
US 2007/0192638 A1 Aug. 16, 2007

(51) Int. Cl.
*G06F 1/26* (2006.01)
(52) U.S. Cl. .................................. 713/330; 327/143
(58) Field of Classification Search .................. 713/330; 327/143
See application file for complete search history.

(56) References Cited
U.S. PATENT DOCUMENTS

| 5,784,576 | A | 7/1998 | Guthrie et al. |
| 5,875,310 | A | 2/1999 | Buckland et al. |
| 6,269,416 | B1 | 7/2001 | Meier et al. |
| 6,574,695 | B1 | 6/2003 | Mott et al. |
| 6,917,123 | B2 * | 7/2005 | Rowe ........................... 307/43 |
| 2002/0154646 | A1 | 10/2002 | Dubois et al. |
| 2004/0027752 | A1 | 2/2004 | Craton et al. |
| 2006/0010333 | A1 * | 1/2006 | Rhodes et al. .............. 713/330 |
| 2006/0139070 | A1 * | 6/2006 | Kim ........................... 327/143 |

OTHER PUBLICATIONS

Daniels and Tom Fowler, "Dual Output Power Supply Sequencing for High Performance Processors," Texas Instruments Application Note SLVA117, Jul. 17, 2002.*

* cited by examiner

*Primary Examiner*—Thomas Lee
*Assistant Examiner*—Albert Wang
(74) *Attorney, Agent, or Firm*—Cynthia S. Byrd, Esq.; Steven M. Greenberg, Esq.; Carey Rodriguez Greenberg & Paul LLP

(57) ABSTRACT

Embodiments of the invention address deficiencies of the art in respect to power sequencing, and provide a method, system and computer program product for supporting coupling with independent logic circuits. In one embodiment of the invention, a computer system supporting coupling with independent logic circuits may include an independent logic circuit including at least one voltage regulator that regulates voltage to core logic such that voltage is transferred to the core logic upon receiving a first level of voltage. The independent logic circuit may further include an I/O driver that becomes operational upon receiving a highest level of voltage higher than the first level of voltage. The computer system may further include a voltage ramp for transferring voltage to the independent logic circuit at the first level voltage for a predetermined period of time and subsequently at the highest level of voltage.

7 Claims, 4 Drawing Sheets

CONTROLLED POWER SEQUENCING FOR INDEPENDENT LOGIC CIRCUITS THAT TRANSFERS VOLTAGE AT A FIRST LEVEL FOR A PREDETERMINED PERIOD OF TIME AND SUBSEQUENTLY AT A HIGHEST LEVEL

BACKGROUND OF THE INVENTION

1. Field of the Invention

The present invention relates to the field of power sequencing and more specifically to power sequencing for independent logic circuits.

2. Description of the Related Art

Individual computers, such as PCs and workstations, and server systems are often fitted with a variety of independent logic circuits after setup. Independent logic circuits include Ethernet adapters, video cards, sound cards, Bluetooth adapters or any independent application specific integrated circuit that can be connected to the communications bus of a master computer system via a common interface connection standard, such as Small Computer System Interface (SCSI), Peripheral Component Interconnect (PCI) or Personal Computer Memory Card International Association (PCMCIA). One method of connecting an independent logic circuit to a master computer system is by hot-plugging, which refers to the ability to add and remove devices to a computer while the computer is running and have the operating system automatically recognize the change. Several external bus standards, such as Universal Serial Bus (USB) and IEEE 1394, support hot-plugging.

A common problem with the coupling of independent logic circuits to a master computer system arises when the master computer system is on standby or asleep. In this situation, standby or auxiliary power is often still present in the machine such that certain components, such as an Ethernet adapter card, can continue to perform certain necessary functions, such as detecting the reception of a Wake-on-LAN signal, thereby spawning a complete wake-up of the system. If an independent logic circuit is plugged into the master computer system or otherwise connected to the master computer system while standby power is still present, the logic module could behave improperly and emit an unexpected signal, such as a spurious Wake-on-LAN power management event (PME) signal, over an interrupt line and lead to an unforeseen occurrence, such as a full system wake-up. This situation also occurs when a standard that supports hot-plugging, such as PCI, sees the insertion of a PCI module while standby power is present. The negative effects of such an occurrence include the unintended wake-up of the master computer system, the reception of incorrect or false PME events and/or the presence of system error messages.

The problem described above arises from the powering of the I/O driver of the independent logic circuit before the core logic of the circuit. Typically, independent logic circuits expect a power-up process wherein the core logic of the circuit is powered up before the I/O driver of the circuit. When this process is interrupted or executed out of sequence, unexpected signals can be emitted from the interrupts of the circuit. Conventionally, this problem was avoided by instructing administrators not to plug independent logic circuits into a master computer system while on standby power. They were instructed to completely power off (including standby power) the master computer system before adding the independent logic circuit. The drawback to this approach is that users who purchase a hot-plug-capable independent logic circuit expect to be able to hot-plug the circuit into an independent logic circuit into a master computer system while it is powered on, powered off, on standby or asleep.

Another approach to the problem described above includes power sequencing of various voltage rails to the logic of the independent logic circuit. The draw back to this approach is that every voltage rail attached to an independent logic circuit requires power switches and associated control lines. In fact, some independent logic circuits can use three to four voltage rails. This can be costly to manufacture and increases the complexity of the system. Yet another approach to this problem is a power design that allows for a seamless transition between full voltage when a computer system is completely powered on and standby voltage when a computer system is asleep or on standby. This approach, however, is not applicable to certain independent logic circuits that support hot-plugging, such as hot-pluggable PCI adapters, since the PCI standard only allows for standby power at the PCI slot.

Yet another approach to this problem includes the regulation of error or interrupt signals from the independent logic circuit during warm-up or start-up of the independent logic circuit when inserted during standby. The drawback to this approach is that it is not universally applicable to all independent logic circuits and is applied only after improper behavior of the logic circuit is observed when plugging during standby. Independent logic circuits of different types behave differently when plugged during standby. Thus, the need arises to solve the problems with the prior art above and specifically for a more efficient way to couple independent logic circuits with a master computer system during standby.

BRIEF SUMMARY OF THE INVENTION

Embodiments of the invention address deficiencies of the art in respect to power sequencing for independent logic circuits and provide a novel and non-obvious method, system and apparatus for coupling of independent logic circuits with a master computer system. In one embodiment of the present invention, a computer system supporting coupling with independent logic circuits may comprise an independent logic circuit including at least one voltage regulator that regulates voltage to core logic such that voltage is transferred to the core logic upon receiving a first level of voltage. The independent logic circuit may further include an I/O driver that becomes operational upon receiving a highest level of voltage higher than the first level of voltage. The computer system may further include a voltage ramp for transferring voltage to the independent logic circuit at the first level voltage for a predetermined period of time and subsequently at the highest level of voltage.

The independent logic circuit may comprise any one of an Ethernet adapter, a sound card, a video card, an 802.11 adapter, and a Bluetooth adapter. Further, the independent logic circuit is coupled to the computer system via any one of the SCSI standard, the PCI standard or the PCMCIA standard. Additionally, the independent logic circuit can comprise a first and a second voltage regulator, wherein the first voltage regulator regulates voltage to a first core logic such that voltage is transferred to the first core logic upon receiving a first level of voltage and wherein the second voltage regulator regulates voltage to a second core logic such that voltage is transferred to the second core logic upon receiving a second level of voltage higher than the first level of voltage. The voltage ramp may transfer voltage to the independent logic circuit at the first level voltage for a predetermined period of time, then at the second level of voltage for a predetermined period of time and then at the highest level of voltage.

In another embodiment of the present invention, a method on a computer system for supporting coupling with independent logic circuits can include regulating voltage to core logic of an independent logic circuit such that voltage is transferred to the core logic upon receiving a first level of voltage. The method may further include initializing an I/O driver of the independent logic circuit upon receiving a highest level of voltage higher than the first level of voltage. The method may further include transferring voltage to the independent logic circuit at the first level voltage for a predetermined period of time and subsequently at the highest level of voltage.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL
VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for supporting coupling with independent logic circuits into a master computer system. In accordance with an embodiment of the present invention, a computer system for supporting coupling with an independent logic circuit, such as a PCI Ethernet adapter, includes a voltage ramp for transferring power to the independent logic circuit in a stepped fashion, such as at two or three voltage levels. The independent logic circuit includes an I/O driver that becomes operational at a highest voltage level, such as 3.3 volts. The independent logic circuit further includes one or more voltage regulators that transfer power to one or more core logic of the circuit. For example, a first voltage regulator provides voltage to a first core logic at a first voltage level, such as 1 volt, and a second voltage regulator provides voltage to a second core logic at a second voltage level, such as 2.2 volts.

When the independent logic circuit is plugged into the master computer system during standby, i.e., while standby power is applied within the computer system, the voltage ramp transfers power to the independent logic circuit in a stepped fashion, first at 1 volt for a predetermined period of time, then at 2.2 volts for a predetermined period of time and then at a constant 3.3 volts. This power sequencing process allows the I/O driver of the independent logic circuit to become operational only after the first and second core logic of the circuit becomes operational, thereby avoiding the problems associated with the prior art—namely, unexpected and unwanted interrupt or PME signals.

Figure 1:
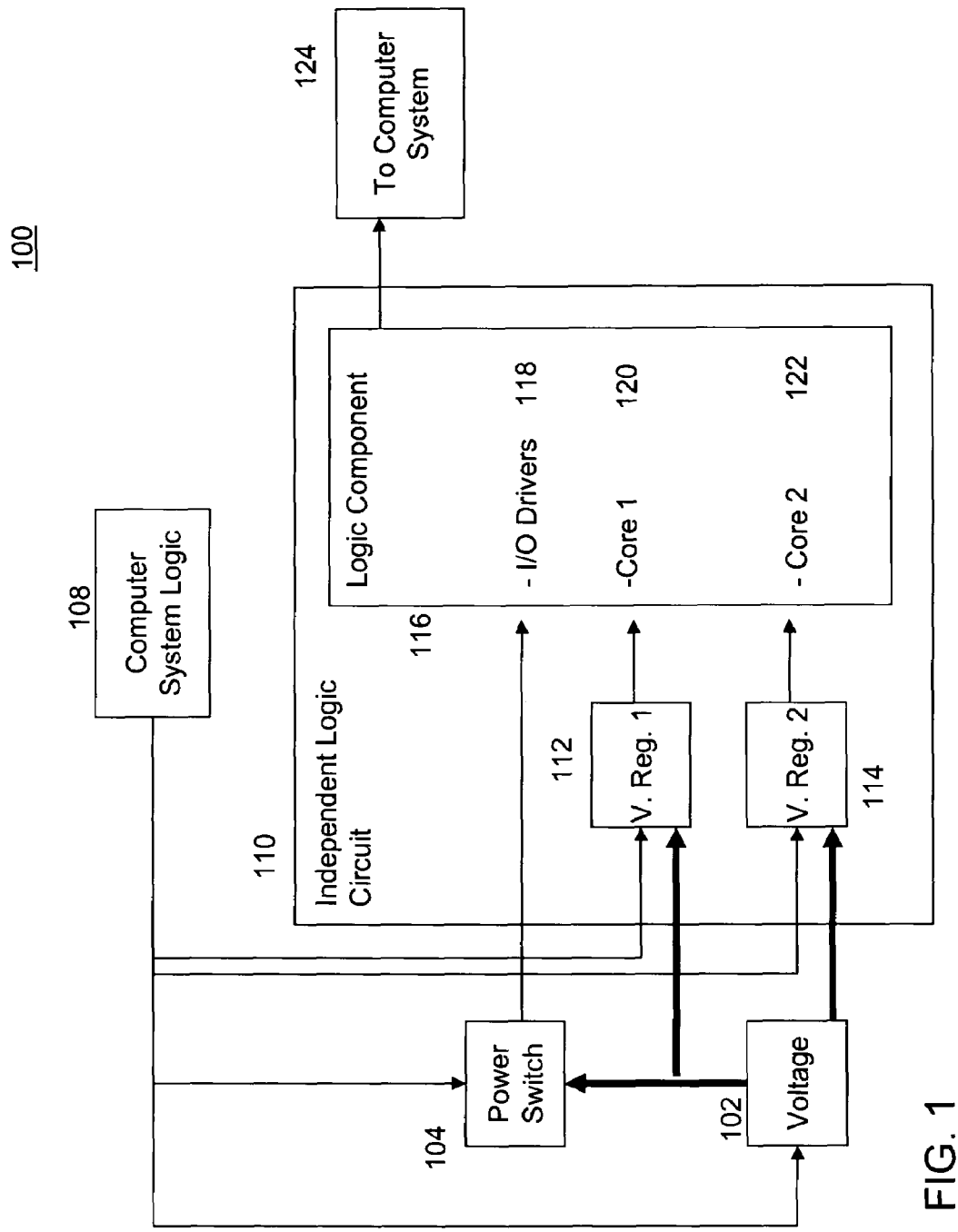
FIG. 1 is a schematic illustration of a first conventional computer system for supporting coupling with independent logic circuits.

FIG. 1 is a schematic illustration of a first conventional computer system 100 for supporting coupling with independent logic circuits. FIG. 1 shows an independent logic circuit 110 coupled with the computer system 100. The independent logic circuit 110 includes an I/O driver 118 and two separate core logics 120 and 122. Each core logic is associated with one portion of the core logic of the independent logic circuit 110. Each core logic 120, 122 is serviced by a voltage regulator 112, 114, respectively. A voltage regulator is a small device or circuit that regulates the voltage fed to a portion or all of a microprocessor. A voltage regulator reduces the volt signal received to a lower voltage required by the portion or all of a microprocessor. A power switch 104 switches power from the computer system 100 to the I/O driver 118. Voltage source 102 provides power to the power switch 102 and the voltage regulators 112, 114, typically at 3.3 volts when the computer system 100 is fully powered on or standby voltage of 3.3 volts.

FIG. 1 further shows that the logic 108 of the computer system 100 is coupled to and exercises control over the power switch 102 and the voltage regulators 112, 114 according to a predefined logical sequence. Plugging of the independent logic circuit 110 into the conventional computer system 100 during standby occurs as follows. First, the independent logic circuit 110 is physically connected to the computer system 100 by an administrator. The power switch 104 is switched to an off position before physical connection of the independent logic circuit 110. Voltage 102 (at any voltage level, from about 1 to about 3.3 volts, for example) is immediately received and detected by voltage regulators 112, 114, however, the voltage regulators 112, 114 are disengaged beforehand by the logic 108.

Subsequently, logic 108 enables voltage regulator 114 to operate, thereby transferring power at a first voltage level, such as about 1 volt, to core logic 122. Logic 108 then waits for a predetermined period of time to pass. Then, logic 108 enables voltage regulator 112 to operate, thereby transferring power at a second voltage level, such as about 2.2 volts, to core logic 120. Logic 108 then waits for a second predetermined period of time to pass. Lastly, logic 108 enables power switch 104 to the on position, thereby transferring power at a highest voltage level, such as about 3.3 volts, to the I/O drivers 118. The sequence described above allows for the elimination of false or incorrect signals or interrupts to be emitted by the independent logic circuit 110 over the output line 124. However, the design of system 100 requires numerous control lines from the logic 108 to the power switch 104 and each voltage regulator 112, 114. Further, the design of system 100 requires additional logic to be programmed into the logic 108 for controlling the power switch 104 and each voltage regulator 112, 114. These additional requirements can be costly to manufacture and increases the complexity of the computer system 100.

Figure 2:
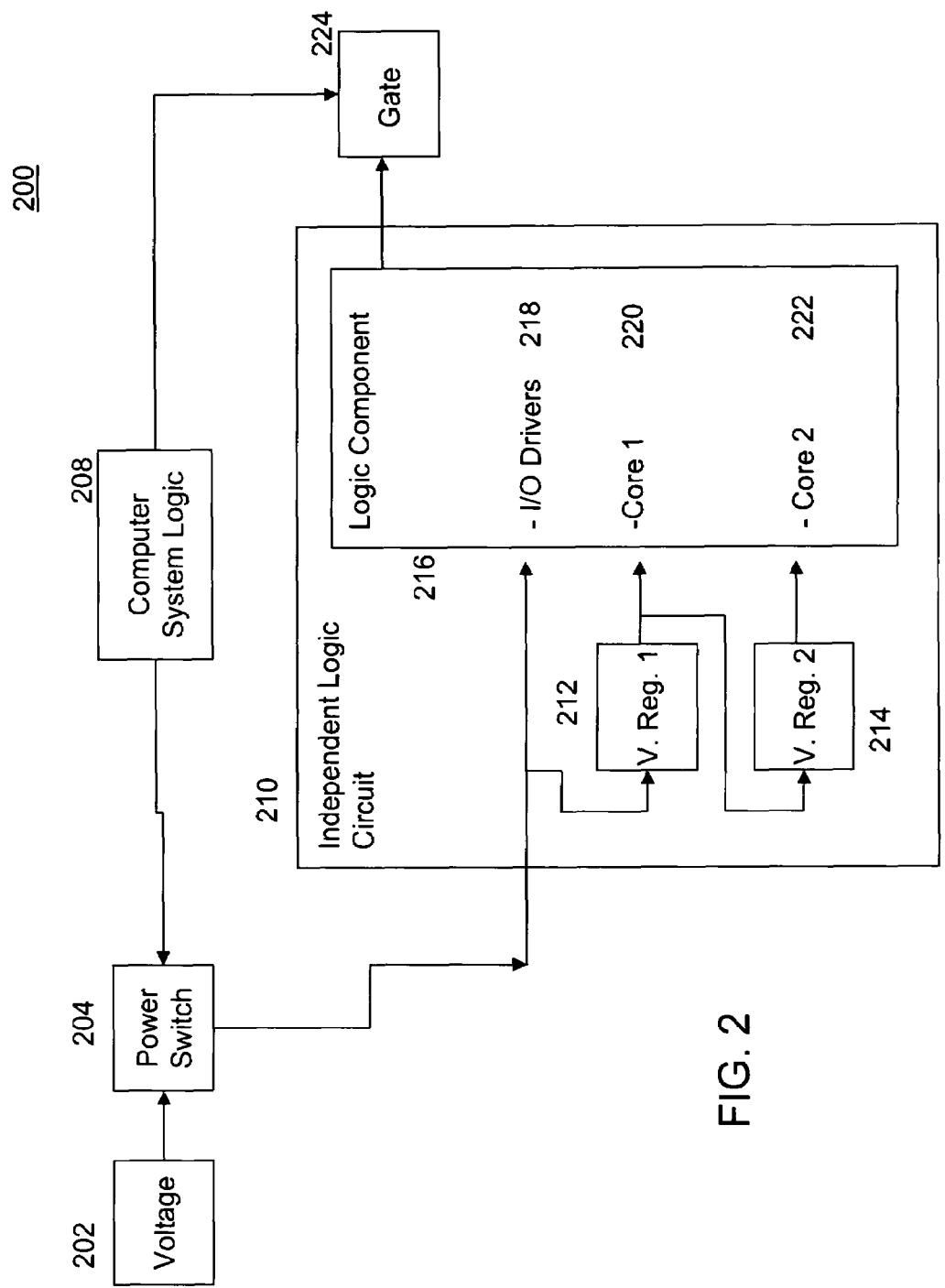
FIG. 2 is a schematic illustration of a second conventional computer system for supporting coupling with independent logic circuits.

FIG. 2 is a schematic illustration of a second conventional computer system 200 for supporting coupling with independent logic circuits. FIG. 2 shows an independent logic circuit 210 coupled with the computer system 200. Like FIG. 1, the independent logic circuit 210 includes a logic component 216, an I/O driver 218 and two separate core logics 220 and 222, wherein each core logic is serviced by a voltage regulator 212, 214, respectively. A power switch 204 switches power from the computer system 200 to the I/O driver 218 and the voltage regulators 212, 214. Voltage source 202 provides power to the power switch 202 and the voltage regulators 212, 214.

FIG. 2 further shows that the logic 208 of the computer system 200 is coupled to and exercises control over the power switch 102 and gate 224, according to a predefined logical sequence. Plugging of the independent logic circuit 210 into the conventional computer system 200 during standby occurs as follows. First, the independent logic circuit 210 is physically connected to the computer system 200 by an administrator. The power switch 204 is switched to an off position and the gate 224 is disconnected before physical connection of the independent logic circuit 110. Then, the logic 208 instructs the power switch 204 to turn to the on position, thereby transferring the voltage of power source 202 (at any voltage level, from about 1 volts to about 3.3 volts, for example) to the I/O driver 218 and voltage regulators 220, 222.

If the voltage applied is at a first voltage level, for example 1 volt, the voltage regulator 214, which operates at the first voltage level, is enabled and transfers power to the core logic 222. If the voltage applied is at the second voltage level, for example 2.2 volts, 1) the voltage regulator 212, which operates at the second voltage level, is enabled and transfers power to the core logic 220, and 2) the voltage regulator 214, which operates at the first voltage level, is also enabled and transfers power to the core logic 222. If the voltage applied is at the highest voltage level, for example 3.3 volts, 1) the I/O driver 318, which operates at the third voltage level, 3.3 volts, is enabled and begins operation, 2) the voltage regulator 212, which operates at the second voltage level, is enabled and transfers power to the core logic 220, and 3) the voltage regulator 214, which operates at the first voltage level, is also enabled and transfers power to the core logic 222. After the circuit 210 is powered at the highest voltage level and a predefined period of time has passed, the logic 208 instructs the gate 224 to close or engage.

Thus, when the power switch 204 is turned to the on position, if the voltage applied is at the highest voltage level, for example 3.3 volts, the power sequencing process described above allows the I/O driver 218 of the independent logic circuit 210 to become operational before or during operation of the first and second core logic 220, 222 of the circuit 210, thereby causing the problems associated with the prior art—namely, unexpected and unwanted interrupt or PME signals send to the computer system 200 via the output line of the independent logic circuit 210. The conventional computer system 200, however, disengages gate 224 until after the I/O driver 218 and first and second core logic 220, 222 of the circuit 210 have powered up and emitted all error or interrupt signals, thereby avoiding the reception of such signals. However, the design of system 200 requires additional control lines from the logic 208 to the gate 224 and requires additional logic to be programmed into the logic 208 for controlling the gate 224. These additional requirements can be costly to manufacture and increases the complexity of the computer system 200.

Figure 3:
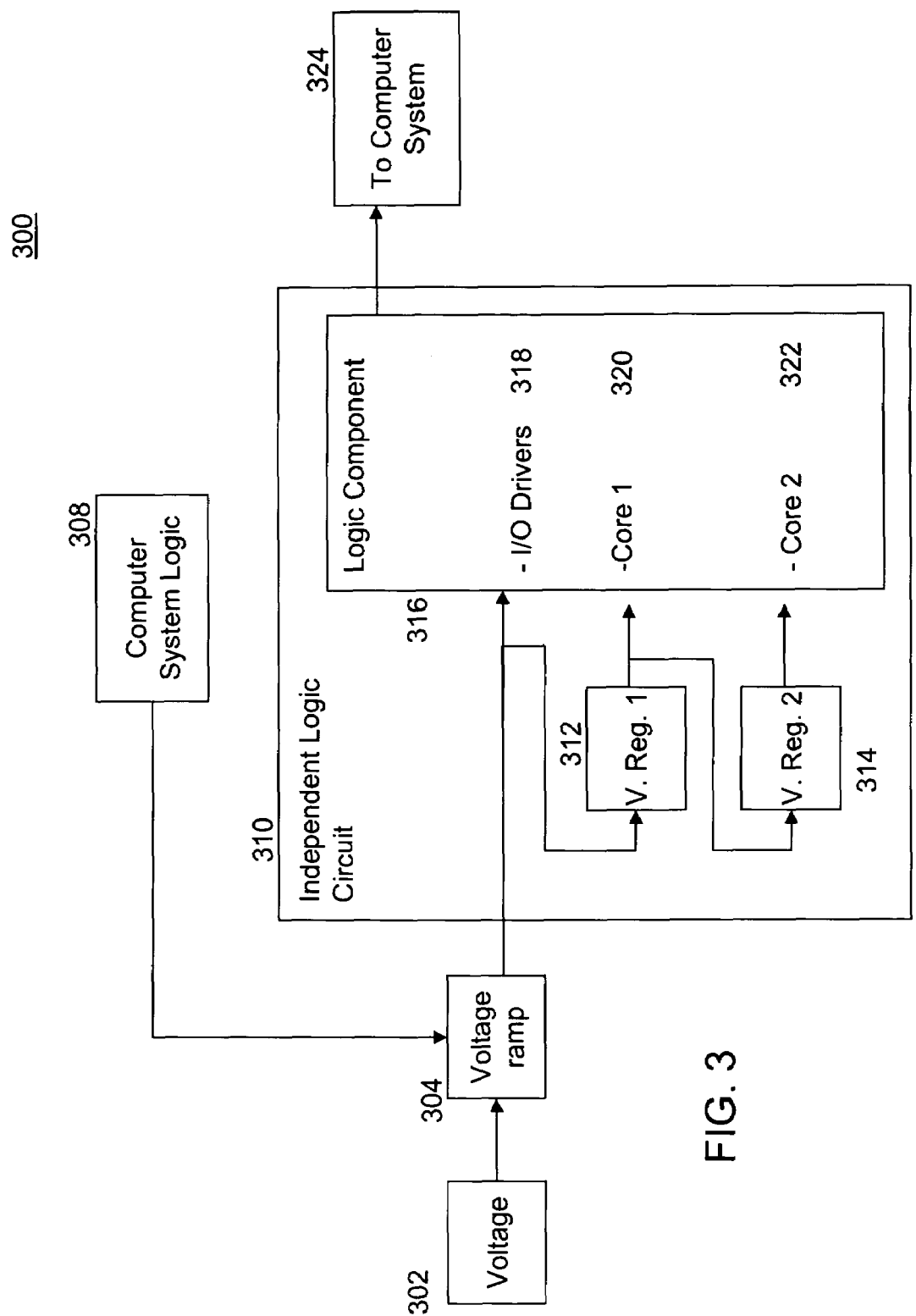
FIG. 3 is a schematic illustration of a computer system for supporting coupling with independent logic circuits, according to one embodiment of the present invention; and, FIG. 4 is a flow chart illustrating a process for supporting coupling with independent logic circuits, according to one embodiment of the present invention.

FIG. 3 is a schematic illustration of a computer system 300 for supporting coupling with independent logic circuits, according to one embodiment of the present invention. FIG. 3 shows an independent logic circuit 310 coupled with the computer system 300. Like FIG. 1 and FIG. 2, the independent logic circuit 310 includes a logic component 316, an I/O driver 318 and two separate core logics 320 and 322, wherein each core logic is serviced by a voltage regulator 312, 314, respectively. A voltage ramp 304 transfers power from the computer system 300 to the I/O driver 318 and the voltage regulators 312, 314. A voltage ramp is a device that ramps up voltage according to a predefined arrangement. An example of a voltage ramp is a pulse width modulator, which modulates a power source in order to control the amount of power sent to a load. A pulse width modulator may produce a step-shaped output wherein a first voltage output is produced for a predefined period of time, then a second, higher voltage output is produced for a period of time, then a third, higher voltage output is produced, and so on and so forth.

It should be noted that although FIG. 3 shows voltage regulators 312, 314 arranged in series such that the output of voltage regulator 312 supplies the input of voltage regulator 314, the present invention also supports an arrangement similar to that of FIG. 2, wherein each voltage regulator 312, 314 is supplied directly by the voltage 302 via the voltage ramp 304.

Voltage source 302 provides power to the voltage ramp 304 and the voltage regulators 312, 314. FIG. 3 further shows that the logic 308 of the computer system 300 is coupled to and exercises control over the voltage ramp 304 according to a predefined logical sequence. It should be noted that although FIG. 3 shows only two core logic, each being serviced by a voltage regulator, the present invention supports any viable number of core logic portions, each serviced by at least one voltage regulator.

Plugging of the independent logic circuit 310 into the conventional computer system 300, whether the system is on standby or completely powered, occurs as follows. First, the independent logic circuit 310 is physically connected to the computer system 300 by an administrator. Voltage ramp 304 transfers power to the independent logic circuit 310 in a stepped fashion, for example, first at 1 volt for a predetermined period of time, then at 2.2 volts for a predetermined period of time and then at a constant 3.3 volts. When the first voltage level, 1 volt, is applied, the voltage regulator 314, which operates at the first voltage level, is enabled and transfers power to the core logic 322. When the second voltage level, 2.2 volts, is applied, the voltage regulator 312, which operates at the second voltage level, is enabled and transfers power to the core logic 320. Lastly, the I/O driver 318, which operates at the third voltage level, 3.3 volts, is enabled and begins operation.

The power sequencing process described above allows the I/O driver 318 of the independent logic circuit 310 to become operational only after the first and second core logic 320, 322 of the circuit 310 becomes operational, thereby avoiding the problems associated with the prior art—namely, unexpected and unwanted interrupt or PME signals send to the computer system 300 via the output line 324 of the independent logic circuit 310.

Figure 4:
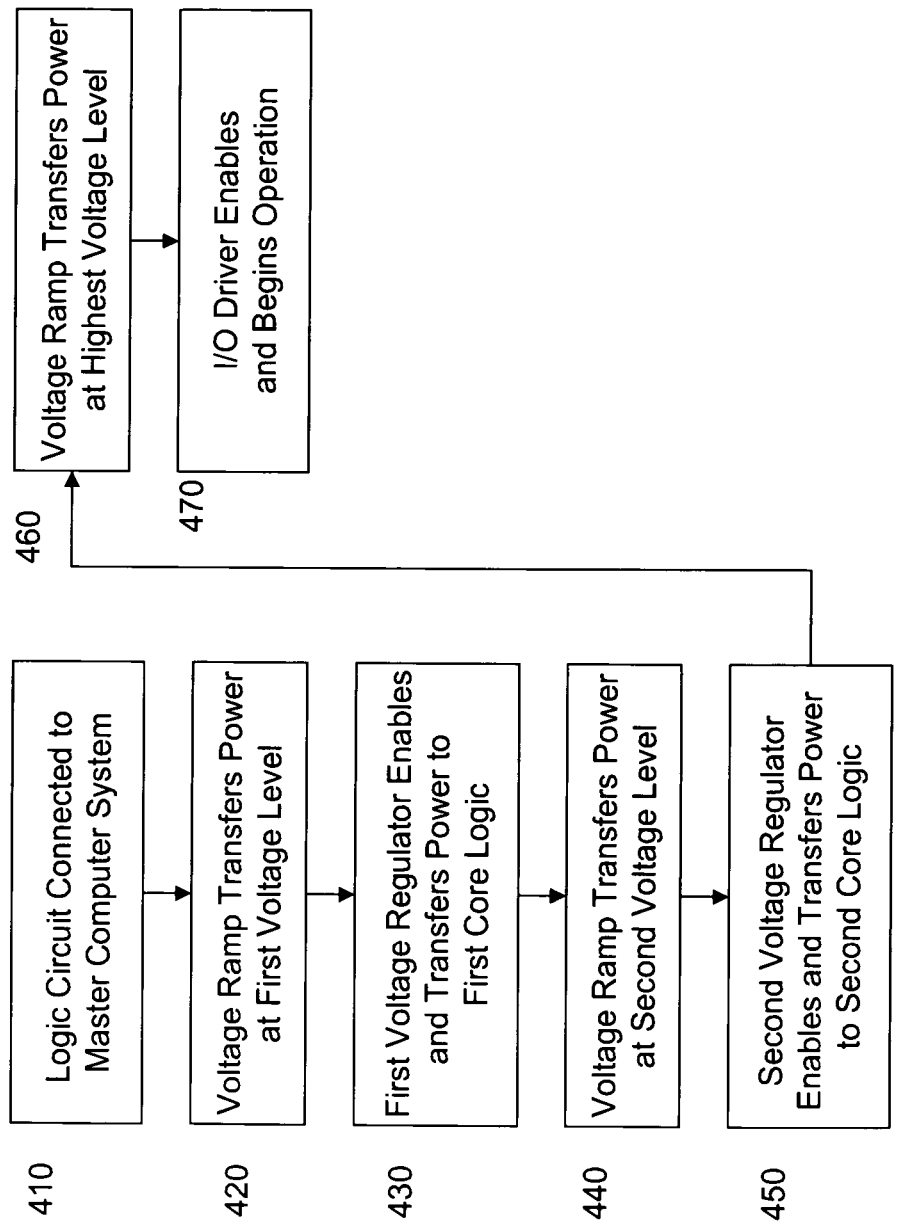

FIG. 4 is a flow chart illustrating a process for supporting coupling with independent logic circuits, according to one embodiment of the present invention. Notably, the process can be performed within computer system 300 for power sequencing to support coupling with independent logic circuits, such as circuit 310, into a master computer system 300 without experiencing interrupts, false error or spurious PME messages. Beginning in block 410, the independent logic circuit, such as circuit 310, is physically connected to the master computer system, such as computer system 300.

In block 420, a voltage ramp, such as voltage ramp 304, transfers power to the independent logic circuit in a stepped fashion starting at a first voltage level, 1 volt for example, for a predetermined period of time. In block 430, a first voltage regulator, which operates at the first voltage level, is enabled and transfers power to a first core logic. In block 440, the voltage ramp transfers power to the independent logic circuit at a second voltage level, 2.2 volts for example, for a predetermined period of time. In block 450, a second voltage regulator, which operates at the second voltage level, is enabled and transfers power to a second core logic. In block 460, the voltage ramp transfers power to the independent logic circuit at a highest voltage level, 3.3 volts for example. In block 470, an I/O driver, which operates at the highest voltage level, is enabled and begins operation.

The embodiments of the invention can take the form of an entirely hardware embodiment, an entirely software embodiment or an embodiment containing both hardware and software elements. In one embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method on a computer system for supporting coupling with independent logic circuits, comprising:
   regulating voltage to core logic of an independent logic circuit such that voltage is transferred to the core logic upon receiving a first level of voltage;
   initializing an I/O driver of the independent logic circuit upon receiving a highest level of voltage higher than the first level of voltage; and
   transferring voltage to the independent logic circuit at the first level voltage for a predetermined period of time and subsequently at the highest level of voltage.

2. The method of claim 1, wherein the step of regulating comprises:
   regulating voltage to a first core logic and a second core logic of an independent logic circuit such that voltage is transferred to the first core logic upon receiving a first level of voltage and voltage is transferred to the second core logic upon receiving a second level of voltage higher than the first level of voltage.

3. The method of claim 2, wherein the step of initializing comprises:
   initializing an I/O driver of the independent logic circuit upon receiving a highest level of voltage higher than the first level of voltage and higher than the second level of voltage.

4. The method of claim 3, wherein the step of transferring comprises:
   transferring voltage to the independent logic circuit at the first level voltage for a predetermined period of time, then at the second level of voltage for a predetermined period of time and then at the highest level of voltage.

5. The method of claim 1, wherein the step of regulating comprises:
   regulating voltage to a first core logic and a second core logic of an independent logic circuit such that voltage is transferred to the first core logic upon receiving about 1 volt and voltage is transferred to the second core logic upon receiving about 2.2 volts.

6. The method of claim 5, wherein the step of initializing comprises:
   initializing an I/O driver of the independent logic circuit upon receiving about 3.3 volts.

7. The method of claim 6, wherein the step of transferring comprises:
   transferring voltage to the independent logic circuit at about 1 volt for a predetermined period of time, then at about 2.2 volts for a predetermined period of time and then at about 3.3 volts.

\* \* \* \* \*